(12) United States Patent
Sakata

(10) Patent No.: US 9,428,167 B2
(45) Date of Patent: Aug. 30, 2016

(54) VEHICLE BRAKE DEVICE

(71) Applicant: ADVICS CO., LTD., Kariya (JP)

(72) Inventor: Yasunori Sakata, Toyota (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 161 days.

(21) Appl. No.: 13/684,350

(22) Filed: Nov. 23, 2012

(65) Prior Publication Data

US 2013/0127241 A1 May 23, 2013

(30) Foreign Application Priority Data

Nov. 23, 2011 (JP) .................. 2011-255640

(51) Int. Cl.
*B60T 13/58* (2006.01)
*B60T 8/40* (2006.01)
*B60T 13/14* (2006.01)
*B60T 17/22* (2006.01)

(52) U.S. Cl.
CPC .............. *B60T 13/58* (2013.01); *B60T 8/4077* (2013.01); *B60T 13/147* (2013.01); *B60T 17/221* (2013.01)

(58) Field of Classification Search
CPC ...... B60T 15/16; B60T 15/048; B60T 8/441; B60T 8/446; B60T 8/4081; B60T 13/66; B60T 13/145; B60T 13/156; B60T 13/686; B60T 17/18; B60T 13/58; B60T 13/68
USPC ........... 303/14, 2, 114.1, 114.2, 114.3, 113.3
See application file for complete search history.

(56) References Cited

U.S. PATENT DOCUMENTS

| | | | |
|---|---|---|---|
| 3,877,756 A * | 4/1975 | Inada .................. | B60T 8/17633 303/114.1 |
| 4,641,894 A * | 2/1987 | Belart ..................... | B60T 8/446 303/114.1 |
| 4,729,609 A * | 3/1988 | Seibert ..................... | B60T 8/441 188/358 |
| 5,954,406 A | 9/1999 | Sawada | |
| 6,390,568 B1 * | 5/2002 | Tozu ..................... | B60T 8/4881 303/113.4 |
| 6,412,882 B1 * | 7/2002 | Isono ..................... | B60K 6/22 303/11 |
| 2001/0028194 A1 * | 10/2001 | Isono ..................... | B60T 8/367 303/122 |
| 2001/0054842 A1 * | 12/2001 | Tanaka .................. | B60T 8/4845 303/113.1 |
| 2011/0241417 A1 * | 10/2011 | Miyazaki ................ | B60T 7/042 303/2 |

FOREIGN PATENT DOCUMENTS

| | | |
|---|---|---|
| JP | 09-328069 A | 12/1997 |
| JP | 2010-167915 A | 8/2010 |
| WO | WO-2010084412 A1 | 7/2010 |

* cited by examiner

*Primary Examiner* — Robert A Siconolfi
*Assistant Examiner* — San Aung
(74) *Attorney, Agent, or Firm* — Buchanan Ingersoll & Rooney PC

(57) ABSTRACT

A vehicle brake device includes a failure detection means for driving the master piston only by the operation force of the brake operation member along with the operation of the brake operation member, thereby to detect a failure of a master system, when a master cylinder pressure correlation value correlated to the master cylinder pressure is less than a predetermined value, in a case where an operation amount of the brake operation member is a predetermined amount or in a case where the operation force of the brake operation member is a predetermined force; and a driving control means for driving the master piston by force corresponding to the servo pressure in the servo chamber generated by the servo pressure generation portion, when the operation amount of the brake operation member is greater than a predetermined amount, or when the operation force of the brake operation member is greater than a predetermined force, in the operation of the brake operation member in which the failure detection means detects the failure of the master system.

4 Claims, 5 Drawing Sheets

Fig. 4
(a)
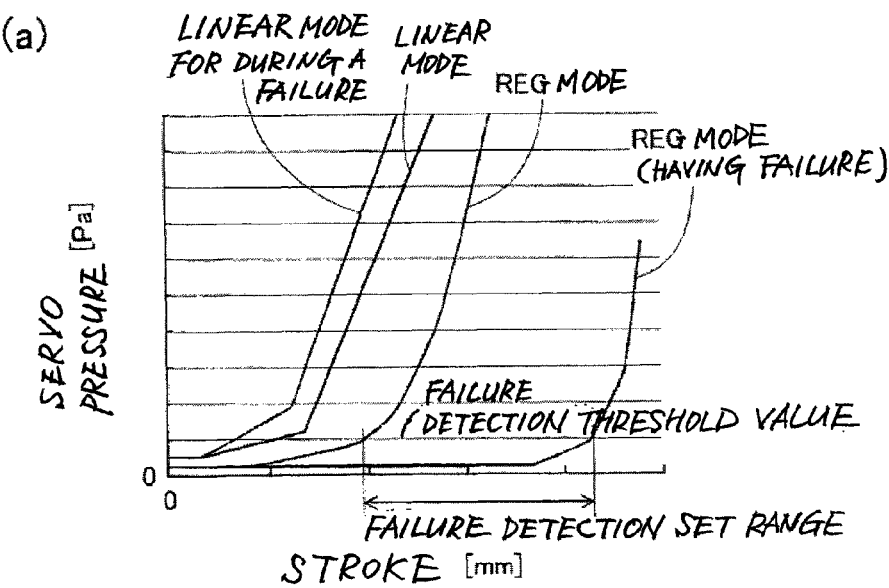
(b)
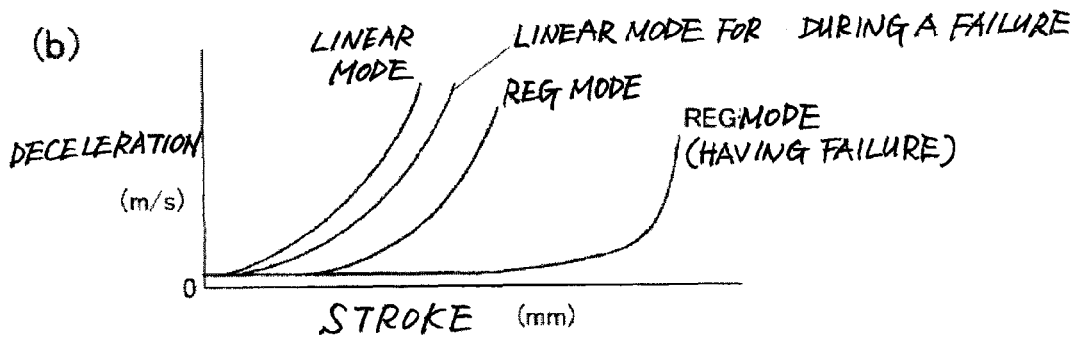
(c)
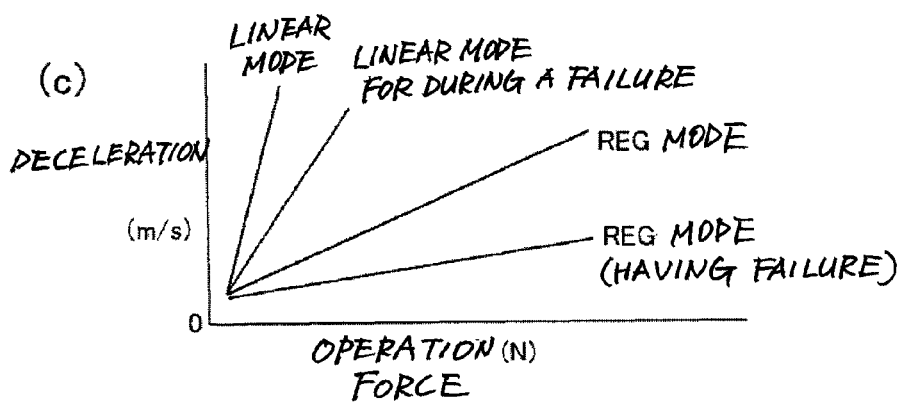

VEHICLE BRAKE DEVICE

TECHNOLOGICAL FIELD

The present invention relates to a vehicle brake device that controls a braking force applied to a vehicle depending on an amount of brake operation by a driver.

BACKGROUND DISCUSSION

As an example of a vehicle brake device configured to control a braking force applied to a vehicle depending on the amount of brake operation by a driver, for example, vehicle brake devices disclosed in JP-A-2010-167915 (Patent Document 1) and JP-A-9-328069 (Patent Document 2) have been known. In the vehicle brake devices, an input piston and a pressing piston are held in a separated state with a predetermined interval (a stroke), and thus a braking force based on a control oil pressure generated by an accumulator and a linear valve is applied to a wheel cylinder depending on the movement of the input piston. In vehicle brake devices, a master system constituted by a master cylinder or the like forming a pressing piston plays an important role.

According to the vehicle brake device described in Patent Document 1, when responsiveness is delayed in the braking pressure due to the linear valve, the valve is turned ON, and responsiveness is improved by also using a driving fluid pressure adjustment device pressure. Furthermore, according to the vehicle brake device described in Patent Document 2, in regard to two types of means for performing a brake assist, a breakdown of one is detected, and when the vacuum booster fails, the brake pressure is increased according to the brake operation.

However, the device disclosed in Patent Document 1 is for the purpose of securing responsiveness of the brake pressing, but does not detect and assist a failure of the master system related to the master cylinder. Furthermore, in the device described in Patent Document 2, even though a failure of a vacuum booster can be detected, a failure of the master system cannot be detected.

SUMMARY

The present invention has been made in view of such circumstances, and an object thereof is to provide a vehicle brake device that is able to detect a failure of the master system, and suppress a drop in braking force after the detection.

According to the present invention, there is provided a vehicle brake device which includes servo pressure generation portions configured to generate a servo pressure in a servo chamber, and in which master piston is driven by any one of a force corresponding to an operation force of a brake operation member and a force corresponding to servo pressure in a servo chamber to generate a master cylinder pressure, the device including: a failure detection means for driving the master pistons by only the operation force of the brake operation member along with the operation of the brake operation member, to thereby detect a failure of a master system, when a master cylinder pressure correlation value related to the master cylinder pressure is less than a predetermined value, in a case where an operation amount of the brake operation member is a predetermined amount or in a case where the operation force of the brake operation member is a predetermined force; and driving control means for driving the master piston by a force corresponding to the servo pressure in the servo chamber generated by the servo pressure generation portion, when the operation amount of the brake operation member is greater than a predetermined amount, or when the operation force of the brake operation member is greater than a predetermined force, in the operation of the brake operation member in which the failure detection means detects the failure of the master system.

BRIEF DESCRIPTION OF THE DRAWING FIGURES

FIGS. 4a to 4c are diagrams that illustrate a servo pressure and a deceleration to a stroke amount, and a deceleration to operation force;

DETAILED DESCRIPTION

Hereinafter, an embodiment of the present invention will be described based on the drawings. In addition, the respective drawings are conceptual diagrams, and the detailed structure sizes thereof are not regulated.

(Configuration of Vehicle Brake Device)

Figure 1:
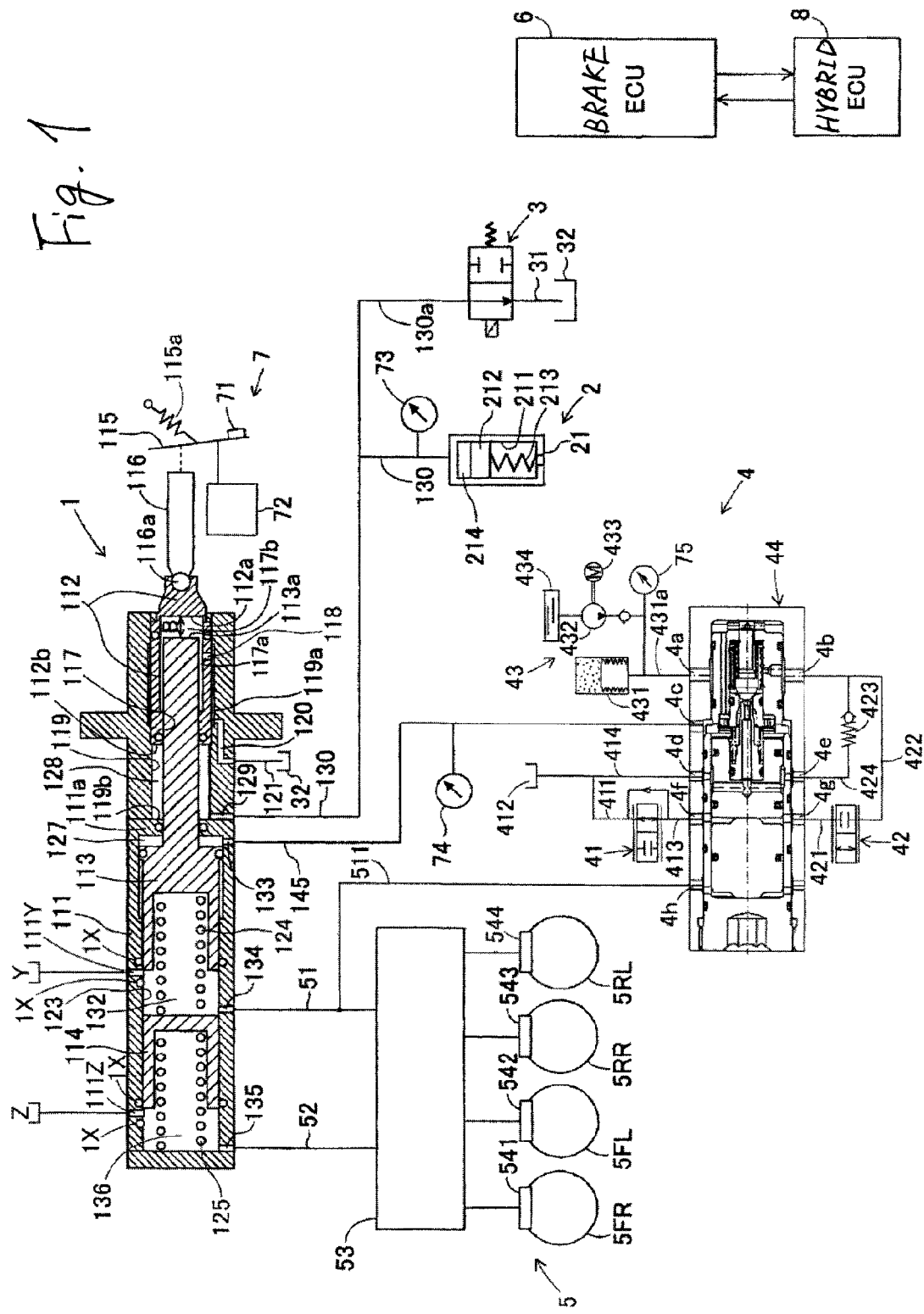
FIG. 1 is a configuration diagram that illustrates a configuration of a vehicle brake device of the present embodiment.

FIG. 1 illustrates a schematic configuration of a vehicle brake device related to the present embodiment. The vehicle brake device of the present embodiment includes a master cylinder 1 having master pistons 113 and 114 that are placed in the advancement direction of an input piston 112 at a separation distance B and are independently and axially slid on the input piston 112; a reaction force generator 2 that generates a reaction force pressure depending on an amount of movement of the input piston 112 in a reaction force chamber 128; a switching valve 3 that is branched from a fluid path 130 through which the reaction force chamber 128 and the reaction force generator 2 communicate with each other and is provided in an opening path 31 communicating with a reservoir 32; a booster 4 that generates a servo pressure; a brake 5 of vehicle wheels 5FR, 5FL, 5RR, and 5RL having wheel cylinders 541 to 544 communicating with fluid pressure chambers 132 and 136 of the master cylinder 1 generating a basis fluid pressure; a brake ECU 6 that controls the switching valve 3 and the booster 4l; various sensors 71 to 74; and a hybrid ECU 8 that controls a regeneration braking force. Hereinafter, the respective components included in the vehicle brake device of the present embodiment will be described in detail. In addition, since the hybrid ECU 8 is well known, the description thereof will be omitted. Furthermore, the various sensors 71 to 74 are able to communicate with the brake ECU 6. The brake ECU 6 controls mainly respective electromagnetic valves 3, 41 and 42, the motor 433 or the like.

(Master Cylinder 1 and Reaction Force Generator 2)

As illustrated in FIG. 1, the master cylinder 1 includes a cylinder 111 forming a cylindrical shape with an opened proximal end portion and a closed leading end portion, and the input piston 112, the first master piston 113 and the second master piston 114 are coaxially and sequentially placed in the interior of the cylinder 111 from the proximal end portion. The pistons are axially fitted in a freely slidable manner. The input piston 112 is placed so that a part thereof is projected to the outside of the proximal end portion of the cylinder 111, an operation rod 116 of a brake pedal 115 is connected to the projected portion using a pivot 116a, and the input piston 112 can be moved via the operation rod 116 by the operation of the brake pedal 115 by a driver. In addition, in the present specification, the amount of movement of the brake pedal 115 is referred to as a "stroke amount or operation amount".

The input piston 112 is fitted to an input cylinder hole 119 formed at the proximal end portion side of the cylinder 111 in a freely slidable manner. In the input piston 112, in an insertion portion into the input cylinder hole 119, a shaft hole 117 is formed in which the leading end side thereof is opened, and a proximal end portion side thereof is blocked to form a blocked surface 112a. A columnar rod-like portion extended from the first master piston 113 to the proximal end portion side through a partition 111a of the cylinder 111 is fitted to the shaft hole 117 in a freely slidable manner. A gap of a predetermined distance B is secured between an end surface 113a of the fitted rod-like portion and the blocked surface 112a of the input piston 112 when the brake pedal 115 is in a non-operation state.

A reaction force chamber 128 is formed between the end surface 112b of the input piston 112 and the partition 111a serving as a bottom portion 119b of the input cylinder hole 119. The reaction force chamber 128 communicates with the outside by a port 129 penetrating a peripheral wall of the cylinder 111. The port 129 is connected to a stroke simulator 21 forming a reaction force generator 2 via a pipe 130.

The stroke simulator 21 is configured so that a piston 212 is fitted to a cylinder 211 in a freely slidable manner, a pilot fluid chamber 214 is formed at a front surface side of the piston 212 biased forward by a compression spring 213, and the pilot fluid chamber 214 communicates with the reaction force chamber 128 via the pipe 130. When the input piston 112 is moved forward by the operation of the brake pedal 115, brake fluid is sent from the reaction force chamber 128 to the pilot fluid chamber 214, and the piston 212 retreats against a spring force that is proportional to the amount of bending of the compression spring 213. Thereby, the pressure in the reaction force chamber 128 rises depending on the amount of brake operation serving as an amount of movement of the brake pedal 115, and the reaction force depending on the amount of the brake operation is applied to the brake pedal 115. The pipe 130 is provided with a pressure sensor 73 that detects the pressure in the reaction force chamber 128. In the present specification, the pressure in the reaction force chamber 128 is referred to as a "reaction force pressure".

The shaft hole 117 is formed to have a large diameter of a predetermined axial length so that a passage 117a of a predetermined gap is formed between the inner peripheral surface of the shaft hole 117 of the input piston 112 and the outer peripheral surface of the rod-like portion of the second master piston 113 along an axial direction. In a peripheral wall of the input piston 112, a through hole 118 penetrating the peripheral wall is formed to communicate with the passage 117a. In addition, the input cylinder hole 119 is formed to have a large diameter of a predetermined axial length so that a passage 119a of a predetermined gap is formed between the outer peripheral surface of the input piston 112 and the inner peripheral surface of the input cylinder hole 119 along the axial direction. In the peripheral wall of the cylinder 111, a passage 120 penetrates and is formed so as to communicate with the vicinity of the leading end of the passage 119a. The passage 120 communicates with the reservoir 32 of the brake fluid by a pipe 121. Thus, a separation portion 117b between the end surface 113a and the blocked surface 112a communicates with the reservoir 32 via the passage 117a, the through hole 118, the passage 119a, the passage 120, and the pipe 121. This communication state is kept regardless of the amount of brake operation, and the separation portion 117b always communicates with atmosphere.

In the cylinder 111, a pressing cylinder hole 123 is formed with the input cylinder hole 119 and the partition 111a interposed therebetween. The first master piston 113 has a U-shaped cross-section, and is fitted to the pressing cylinder hole 123 in a freely slidable manner. The second master piston 114 placed in the leading end portion side of the first master piston 113 has a U-shaped cross-section, and is fitted into the pressing cylinder hole 123 in a freely slidable manner.

The servo chamber 127 is formed between the partition wall 111a and the first master piston 113, a first fluid pressure chamber 132 is formed between the first master piston 113 and the second master piston 114, and the second fluid pressure chamber 136 is formed between the second master piston 114 and the leading end blocked surface of the pressing cylinder hole 123. A first compression spring 124 is interposed between a U-shaped concave portion bottom surface of the first master piston 113 and a back end surface of the second master piston 114, and a second compression spring 125 is interposed between a U-shaped U portion bottom surface of the second master piston 114 and a leading end blocked surface of the pressing cylinder hole 123. Thereby, when the brake pedal 115 is in the non-operation state, the first master piston 113 and the second master piston 114 are biased to the proximal end side of the cylinder 111 by the spring elastic force of the first compression spring 124 and the second compression spring 125, and are each stopped at a predetermined non-operation position.

In the non-operation state of the brake pedal 115, since the input piston 112 is at an initial position by a pedal return spring 115a, the end surface 113a of the rod-like portion of the first master piston 113 is kept from the blocked surface 112a of the input piston 112 at a predetermined gap that is the above-mentioned predetermined distance B. When a driver operates the brake pedal 115 and the input piston 112 relatively advances to the first master piston 113 by the predetermined distance B, the input piston 112 comes into contact with the first master piston 113 to enable pressing of the first master piston 113.

The servo chamber 127 communicates with the outside by the port 133 penetrating the peripheral wall of the cylinder 111. In the first fluid pressure chamber 132 between the first master piston 113 and the second master piston 114, in the vicinity of the back end surface of the second master piston 114 located at a predetermined non-operation position, a port 134 is formed which penetrates the peripheral wall of the cylinder 111 to the outside. In addition, in the second fluid pressure chamber 136 between the leading end portion side of the second master piston 114 and the leading end blocked surface of the cylinder 111, in the vicinity of the leading end blocked surface, a port 135 is formed which penetrates the peripheral wall of the cylinder 111 to the outside.

The servo pressure is generated in the servo chamber 127 using a booster device 4 described later, so that the first master piston 113 and the second master piston 114 advance in the axial direction, and the first fluid pressure chamber 132 and the second fluid pressure chamber 136 are pressed.

The fluid pressure of the first fluid pressure chamber 132 and the second fluid pressure chamber 136 is supplied to the wheel cylinders 541 to 544 as a basic fluid pressure from the ports 134 and 135 via the pipes 51 and 52 and the ABS 53, and a basic braking force (braking force) is applied to the vehicle wheels 5FR to 5RL.

In addition, a seal member such as an O-ring indicated by a white circle in FIG. 1 is mounted between the inner peripheral surface of the input cylinder hole 119 and the outer peripheral surface of the input piston 112, between the pressing cylinder hole 123, the first master piston 113 and the outer peripheral surface of the second master piston 114, and between the inner peripheral surface of the shaft hole 117 of the input piston 112, the partition 111a and the outer peripheral surface of the rod-like portion of the first master piston 113 to prevent leakage of fluid.

Furthermore, at a position of the cylinder 111 in front of the first master piston 113, a port 111Y communicating with a reservoir Y is formed. Similarly, at a front position of the second master piston 114 of the cylinder 111, a port 111Z communicating with the reservoir Z is formed. At both sides (front and back) of the ports 111Y and 111Z, seal members 1× are installed. The master pistons 113 and 114 advance, and the respective seal members 1× come in contact with the corresponding master pistons 113 and 114, and thus the reservoirs Y and Z are separated from the respective fluid pressure chambers 132 and 136. In addition, the sensor 71 is an operation force (stepping force) sensor to detect the force by which a driver steps the brake pedal 115. The sensor 72 is a stroke sensor to detect a stroke amount (an operation amount) of the brake pedal 115.

(Switching Valve 3)

The switching valve 3 is provided between a branched pipe 130a branched from the pipe 130 through which the reaction force chamber 128 communicates with the reaction force generator 2 and the opening path 31 communicating with the reservoir 32. For example, the switching valve 3 can use an electromagnetic valve. The switching valve 3 is opened and closed based on the control signal from the brake ECU 6. When the switching valve 3 is in the opened state, the branched pipe 130a communicates with the opening path 31, and the port 129 of the reaction force chamber 128 communicates with the reservoir 32. When the switching valve 3 is in the closed state, the reaction force pressure formed by the stroke simulator 21 is applied to the reaction force chamber 128.

(Booster 4)

The booster device 4 mainly includes the decompression valve 41, the pressure booster valve 42, the pressure supply portion 43, and the regulator 44. The decompression valve 41 is a usually-opened type electromagnetic valve (a linear valve), and a flow rate thereof is controlled by the brake ECU 6. One side of the decompression valve 41 is connected to the reservoir 412 via the pipe 411, and the other side thereof is connected to the pipe 413. The pressure booster valve 42 is a usually closed-type electromagnetic valve, and a flow rate thereof is controlled by the brake ECU 6. One side of the pressure booster valve 42 is connected to the pipe 421, and the other side thereof is connected to the pipe 422.

The pressure supply portion 43 is means for supplying the high-pressure brake fluid to the regulator 44, based on the instruction of the brake ECU 6. The pressure supply portion 43 mainly has an accumulator 431, a hydraulic pump 432, a motor 433, and a reservoir 434.

The accumulator 431 accumulates the fluid pressure generated by the fluid pressure pump 432. The accumulator 431 is connected to the regulator 44, the pressure sensor 75, and the fluid pressure pump 432 by pipe 431a. The fluid pressure pump 432 is connected to the motor 433 and the reservoir 434. The fluid pressure pump 432 supplies the brake fluid collected in the reservoir 434 to the accumulator 431 by driving the motor 433.

When the pressure sensor 75 detects that the accumulator pressure is lowered to a predetermined value or less, the motor 433 is driven based on the control signal from the brake ECU 6, and the fluid pressure pump 432 supplies the brake fluid to the accumulator 431 and replenishes pressure energy to the accumulator 431.

Figure 2:
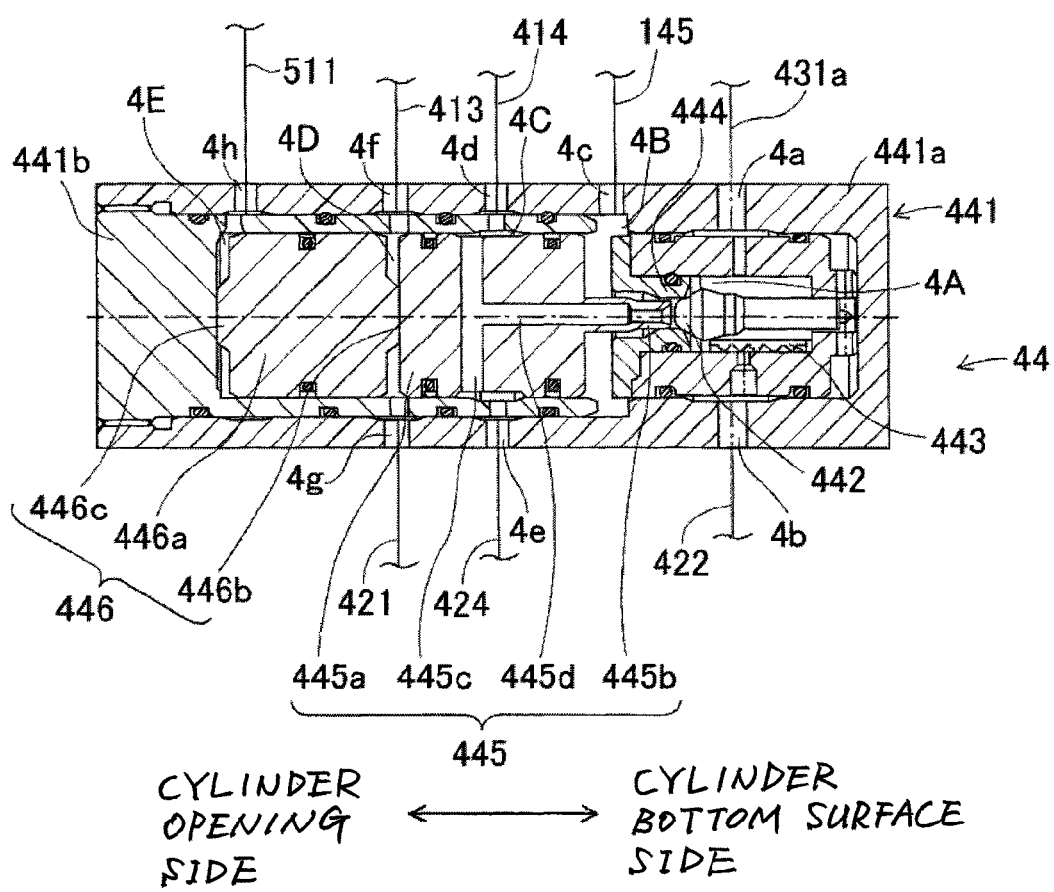
FIG. 2 is a configuration diagram that illustrates a configuration of regulator of the present embodiment.

The regulator 44 is a device in which mainly a sub piston 446 is added to a general regulator. That is, as illustrated in FIG. 2, the regulator 44 mainly includes a cylinder 441, a ball valve 442, a biasing portion 443, a valve seat portion 444, a control piston 445 and a sub piston 446.

The cylinder 441 includes a substantially cylindrical bottomed cylinder case 441a having a bottom surface at one side (a right side in the drawings), and a lid member 441b that blocks the opening (a left side in the drawings) of the cylinder case 441a. In addition, although the lid member 441b is formed to have a U-shaped cross-section in the drawings, in the present embodiment, the description will be made by forming the lid member 441b in a columnar shape and setting a part blocking the opening of the cylinder case 441 as the lid member 441b. The cylinder case 441a is formed with a plurality of ports 4a to 4h through which the interior and the exterior communicate with each other.

The port 4a is connected to the pipe 431a. The port 4b is connected to the pipe 422. The port 4c is connected to the pipe 145. The port 4d is connected to the pipe 414 via the reservoir 412. The port 4e is connected to the pipe 424 communicating with the pipe 422 via a relief valve 423. The port 4f is connected to the pipe 413. The port 4g is connected to the pipe 421. The port 4h is connected to the pipe 511 branched from the pipe 51.

The ball valve 442 is a ball-like valve, and is placed at the bottom surface side (hereinafter, also referred to as a cylinder bottom surface side) of the cylinder case 441a in the interior of the cylinder 441. The biasing portion 443 is a spring member that biases the ball valve 442 to the opening side (hereinafter, also referred to as a cylinder opening side) of the cylinder case 441a, and is installed on the bottom surface of the cylinder case 441a. The valve seat portion 444 is a wall provided on the inner peripheral surface of the cylinder case 441a, and partitions a cylinder opening side and a cylinder bottom surface side. In the center of the valve seat portion 444, a through path 444a is formed through which the first chamber 4A and the second chamber 4B axially penetrating communicate with each other. The valve member 444 holds the ball valve 442 from the cylinder opening side in a state in which the biased ball valve 442 blocks the through path 444a.

A space partitioned by the ball valve 442, the biasing portion 443, the valve seat portion 444, and the inner peripheral surface of the cylinder case 441a of the cylinder bottom surface side is referred to as a first chamber 4A. The first chamber 4A is filled with the brake fluid, is connected to the pipe 431a via the port 4a, and is connected to the pipe 422 via the port 4b.

The control piston 445 includes a substantially columnar main body portion 445a, and a substantially columnar projection portion 445b having a diameter that is smaller than that of the main body portion 445a. The main body portion 445a is placed slidably at the cylinder opening side of the valve seat portion 444 in the cylinder 441 in a coaxial and liquid-tight manner. The main body portion 445a is biased to the cylinder opening side by a biasing member not illustrated. In a substantially center of the main body 445a in the cylinder axial direction, a passage 445c is formed in which both ends are extended in a circumferential direction (a vertical direction in the drawing) opened to the peripheral surface of the main body 445a. A partial inner peripheral surface of the cylinder 441 corresponding to the arrangement position of the opening of the passage 445c is formed with the port 4d, and a concave hollow and the main body portion 445a form a third chamber 4C. Even when the regulator piston 445 slides, the communication state of the passage 445c and the reservoir 412 is kept by the third chamber 4C.

The projection portion 445b is projected from the center of the bottom surface side end surface of the main body portion 445a to the cylinder bottom surface side. A diameter of the projection portion 445b is smaller than that of the through path 444a of the valve seat portion 444. The projection portion 445b is placed on the same axis as the through path 444a. A leading end of the projection portion 445b is separated from the ball valve 442 to the cylinder opening side by a predetermined interval. The projection portion 445b is formed with a passage 445d extended in the cylinder axial direction opened to the center of the bottom surface side end surface of the cylinder of the projection portion 445b. The passage 445d is stretched up to the interior of the main body portion 445a, and is connected to the passage 445c.

A space partitioned by a cylinder bottom side end surface of the main body 445a, the outer surface of the projection portion 445b, the inner peripheral surface of the cylinder 441, the valve seat portion 444, and the ball valve 442 is referred to as a second chamber 4B. The second chamber 4B communicates with the ports 4d and 4e via the passages 445c and 445d and the third chamber 4C when the control piston 445 is in a non-operation state.

The sub piston 446 includes a sub main body portion 446a, a first projection portion 446b, and a second projection portion 446c. The sub main body portion 446a is formed in a substantially columnar shape. In the interior of the cylinder 441, the sub main body portion 446a is placed slidably at the cylinder opening side of the main body portion 445a in a coaxial and liquid-tight manner.

The first projection portion 446b has a substantially columnar shape having a diameter smaller than that of the sub main body portion 446a, and is projected from the end surface center of the cylinder bottom surface side of the sub main body portion 446a. The first projection portion 446b comes into contact with the end surface of the cylinder opening side of the main body portion 445a. The second projection portion 446c has the same shape as the first projection portion 446b, and is projected from the end surface center of the cylinder opening side of the sub main body portion 446a. The second projection portion 446c comes into contact with the lid member 441b.

A space partitioned by the end surface of the cylinder bottom surface side of the sub main body portion 446a, the outer surface of the first projection portion 446b, the end surface of the cylinder opening side of the control piston 445, and the inner peripheral surface of the cylinder 441 is referred to as a pressure control chamber 4D. The pressure control chamber 4D communicates with the decompression valve 41 via the port 4f and the pipe 413, and communicates with the pressure booster valve 42 via the port 4g and the pipe 421.

Meanwhile, a space partitioned by the end surface of the cylinder opening side of the sub main body portion 446a, the outer surface of the second projection portion 446c, the lid member 441b, and the inner peripheral surface of the cylinder 441 is referred to as a fourth chamber 4E. The fourth chamber 4E communicates the port 134 via the port 4h and the pipes 511 and 51. The respective chambers 4A to 4E are filled with the brake fluid.

(Linear Mode)

Herein, the operation of the booster 4 will be described. Firstly, a linear mode serving as a general brake control of controlling the decompression valve 41 and the pressure booster valve 42 using the brake ECU 6 will be described.

In a state where the brake pedal 115 is not stepped on, the regulator 44 is in the same state as mentioned above, that is, a state where the ball valve 442 blocks the through path 444a of the valve seat portion 444. Furthermore, the decompression valve 41 enters the opened state, and the pressure booster valve 42 enters the closed state. That is, the first chamber 4A and the second chamber 4B are blocked by the ball valve 442 and the valve seat portion 444 in this state.

The second chamber 4B communicates with the servo chamber 127 and the chambers are kept at the same pressure. The second chamber 4B communicates with the third chamber 4C via the passages 445c and 445d of the control piston 445. Thus, the second chamber 4B and the third chamber 4C communicate with the reservoir 412. The pressure control chamber 4D is configured so that one side thereof is blocked by the pressure booster valve 42 and the other side thereof communicates with the reservoir 412 via the decompression valve 41. The pressure control chamber 4D and the second chamber 4B are kept at the same pressure. The fourth chamber 4E communicates with the first fluid pressure chamber 132, and the chambers are kept at the same pressure.

From this state, when the brake pedal is stepped on, the brake ECU 6 controls the decompression valve 41, the pressure booster valve 42 and the motor 433, based on information from the stroke sensor 72. That is, the brake ECU 6 controls the decompression valve 41 in a closing direction, and controls the pressure booster valve 42 in an opening direction.

The accumulator 431 communicates with the pressure control chamber 4D by the opening of the pressure booster valve 42. The pressure control chamber 4D and the reservoir 412 are cut off from each other by the closing of the decompression valve 41. It is possible to raise the pressure of the pressure control chamber 4D by the high-pressure brake fluid supplied from the accumulator 431. The control piston 445 slides on the cylinder bottom surface side by the raising of the pressure of the pressure control chamber 4D. Thereby, the leading end of the projection portion 445b of the control piston 445 comes into contact with the ball valve 442, and the passage 445d is blocked by the ball valve 442. Moreover, the second chamber 4B and the reservoir 412 are cut off from each other.

In addition, the control piston 445 slides on the bottom surface side of the cylinder, whereby the ball valve 442 is pushed and moved by the projection portion 445b to the cylinder bottom surface side, and the ball valve 442 is separated from the valve seat portion 444. Thereby, the first chamber 4A and the second chamber 4B communicate with each other by the through path 444a of the valve seat portion 444. The high-pressure brake fluid is supplied to the first chamber 4A from the accumulator 431, and thus the pressure of the second chamber 4B rises due to the communication.

Along with the pressure rise in the second chamber 4B, the pressure of the servo chamber 127 communicating therewith also rises. The first master piston 113 advances due to the pressure rise in the servo chamber 127, and the pressure of the first fluid pressure chamber 132 rises. Moreover, the second master piston 114 also advances, and the pressure of the second fluid pressure chamber 136 rises. Due to the pressure rise in the first fluid pressure chamber 132, the high-pressure brake fluid is supplied to an ABS 53 described later and the fourth chamber 4E described later. Although the pressure of the fourth chamber 4E rises, the pressure of the pressure control chamber 4D also similarly rises, and thus the sub piston 446 is not moved. In this manner, the high-pressure brake fluid is supplied to the ABS 53, the brake 5 is operated, and thus the vehicle is braked. The force causing the first master piston 113 to advance in the linear mode is referred to as a force corresponding to the servo pressure.

(REG Mode)

Herein, an REG mode of driving the first master piston 113 only using the operation force (stepping force) of the brake pedal 115 in regard to an initial predetermined amount without controlling (supplying electricity) the decompression valve 41, the pressure booster valve 42 and the switching valve 3 will be described.

In the REG mode, the decompression valve 41, the pressure booster valve 42, and the switching valve 3 are not supplied with electricity, the decompression valve 41 enters the opened state, the pressure booster valve 42 enters the closed state, and the switching valve 3 enters the opened state. Moreover, this state (non-control state) is maintained even after stepping on the brake pedal 115.

In the REG mode, when the brake pedal 115 is stepped on, the input piston 112 advances. Herein, since the switching valve 3 is in the opened state, the reaction force chamber 128 communicates with the reservoir 32, and thus the reaction force rise due to the simulator 21 does not occur. Moreover, since the decompression valve 41 and the pressure booster valve 42 are not controlled, the pressure of the servo chamber 127 also does not rise, and until the input piston 112 comes into contact with the first master piston 113, the first master piston 113 does not advance. Moreover, and when only the input piston 112 advances, and the separation distance B becomes smaller, the input piston 112 comes into contact with the first master piston 113. The first master piston 113 advances together with the input piston 112 by the operation force of the brake pedal 115. When the volume of the servo chamber 127 is increased along with the advancement of the first master piston 113, the brake fluid is supplied from the reservoir 412.

When the first master piston 113 advances, as in the linear mode, the pressure of the first fluid pressure chamber 132 and the second fluid pressure chamber 136 rises. Moreover, the pressure of the fourth chamber 4E also rises due to the pressure rise in the first fluid pressure chamber 132. The sub piston 446 slides on the cylinder bottom surface side due to the pressure rise in the fourth chamber 4E. At the same time, the control piston 445 is pushed by the first projection portion 446b and slides on the cylinder bottom surface side. Thereby, the projection portion 445b comes into contact with the ball valve 442, and the ball valve 442 is pushed and moved by the cylinder bottom surface side. That is, the first chamber 4A communicates with the second chamber 4B, the servo chamber 127 and the reservoir 412 are cut off from each other, and the high-pressure brake fluid due to the accumulator 431 is supplied to the servo chamber 127.

In this manner, in the REG mode, when the brake pedal 115 is stepped on by a predetermined stroke due to the operation force, the accumulator 431 and the servo chamber 127 communicate with each other, and the servo pressure rises without the control. Moreover, the first master piston 113 advances to a level equal to or greater than the operation force of a driver. Thereby, the high-pressure brake fluid is supplied to the ABS 53. In the REG mode, the pressure depending on the pressure of the fourth chamber 4E is generated in the servo chamber 127 so as to generate a braking force that is able to safely maintain stopping, taking situations when stopped on a slope or the like into consideration.

A force causing first master cylinder 113 to advance in the REG mode is referred to as a "force corresponding to the operation force". That is, the "force corresponding to the operation force" refers to a force causing the first master cylinder 113 to advance only by the operation force, and a force causing the first master cylinder 113 to advance by the servo pressure that is mechanically generated based on the driving thereof.

(Brake 5)

Wheel cylinders 541 to 544 communicate with the first fluid pressure chamber 132 and the second fluid pressure chamber 136 generating the master cylinder pressure via the pipes 51 and 52 and the ABS 53. The wheel cylinders 541 to 544 constitute the brake 5 of vehicle wheels 5FR to 5RL. Specifically, a well-known ABS (Anti-lock Brake System) 53 is connected to the port 134 of the first fluid pressure chamber 132 and the port 135 of the second fluid pressure chamber 136 via pipes 51 and 52, respectively. The wheel cylinders 541 to 544 operating the brake device that brakes the vehicle wheels 5FR to 5RL are connected to the ABS 53.

In the linear mode, the fluid pressure sent from the accumulator 431 of the booster 4 is controlled by the pressure booster valve 42 and the decompression valve 41, and the servo pressure is generated in the servo chamber 127. Thus, the first master piston 113 and the second master piston 114 advance, and the first fluid pressure chamber 132 and the second fluid pressure chamber 136 are pressed. The fluid pressure of the first fluid pressure chamber 132 and the second fluid pressure chamber 136 is supplied to the wheel cylinders 541 to 544 as the basic fluid pressure from the ports 134 and 135 via the pipes 51 and 52 and the ABS 53, and the fluid pressure braking force is applied to the vehicle wheels 5FR to 5RL.

(Control Related to Failure Detection of Master System)

Herein, the control related to the failure detection of the master system will be described. The failure of the master system is, for example, a case where at least one of the seal member 1× fails, and the first fluid pressure chamber 132 or the second fluid pressure chamber 136 communicates with the reservoir Y or the reservoir Z. In this case, even when the first master piston 113 advances, the pressure is absorbed by the reservoir Y or Z, and the pressure value becomes smaller than assumed. In the present embodiment, the failure of the master system is detected, and thus the brake control after the detection can be suitably maintained. Hereinafter, the specific description will be made.

Figure 3:
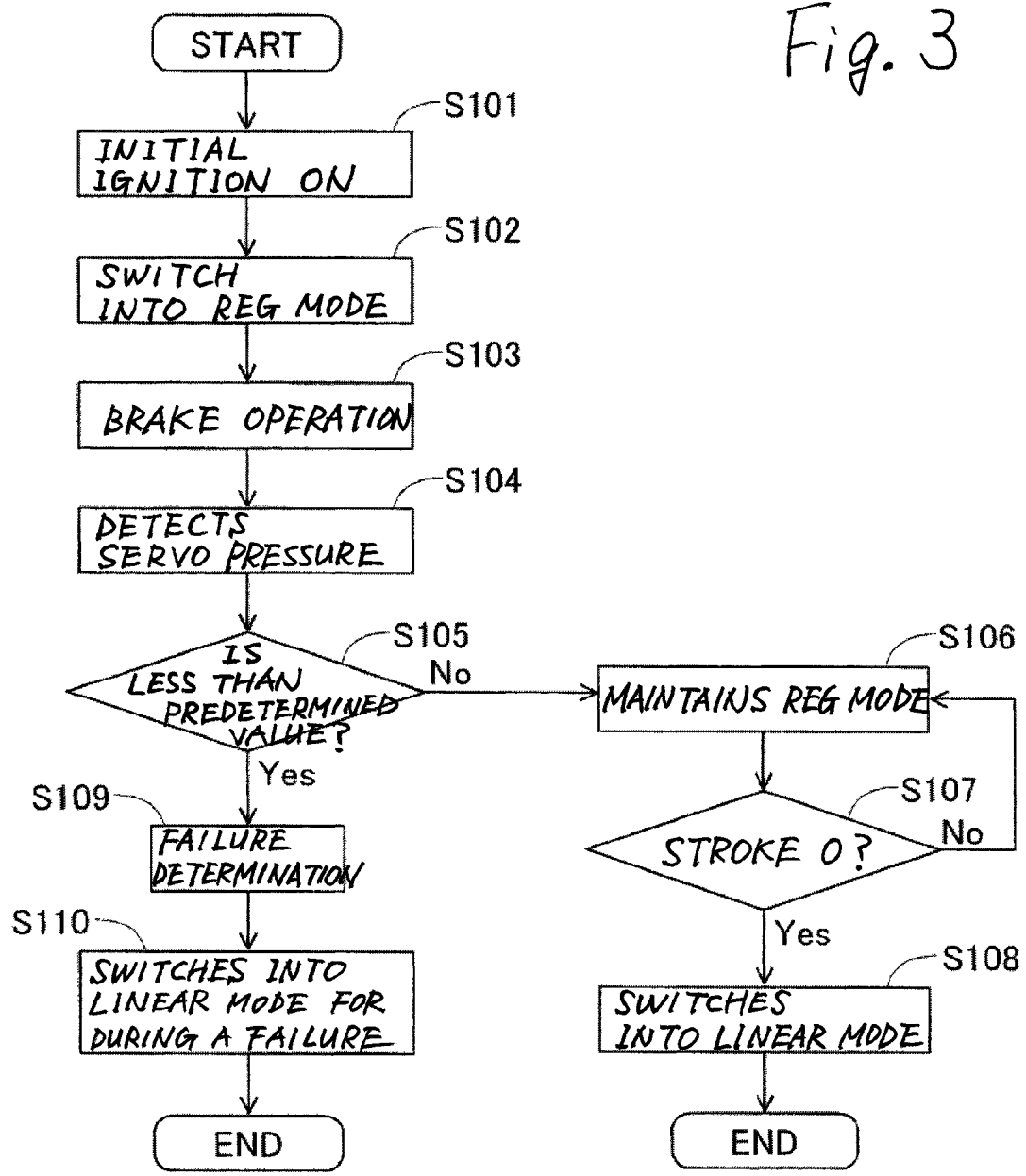
FIG. 3 is a control flowchart related to a failure detection of the master system.

In the present embodiment, the failure detection control is performed when an initial ignition of that day is turned ON. As illustrated in FIG. 3, when the initial ignition is turned ON (S101), the brake ECU 6 switches the control mode from the linear mode to the REG mode (S102). Thereafter, when a driver steps the brake pedal 115 (S103), the brake ECU 6 detects the servo pressure of the pressure sensor 74 (S104). Herein, the pressure of the brake fluid supplied from the first and second fluid pressure chamber 132 and 136 is referred to as a master cylinder pressure. The master cylinder pressure correlates to the servo pressure in the REG mode. Thus, the magnitude of the master cylinder pressure is detected by the pressure sensor 74.

As illustrated in FIG. 4A, a relationship (a map) of a target servo pressure value to a stroke amount (operation amount) at the time of the linear mode and the REG mode is stored in the brake ECU 6. The target servo pressure value is a target value of the servo pressure generated in the servo chamber 127. The value of the servo pressure is a value (a master cylinder pressure correlation value) correlated to the master cylinder pressure in the structure.

The brake ECU 6 controls respective electromagnetic valves 41 and 42 based on the stored target servo pressure in the linear mode. In the REG mode, since the brake ECU 6 does not control the respective electromagnetic valves 41 and 42, as the correlation (the control map) of the REG mode, a servo pressure value expected to be generated if normal (by a test or the like) is stored. In this manner, in the brake ECU 6, the control map of the time of the linear mode and the REG mode is stored.

Herein, the brake ECU 6 determines whether or not the servo pressure detected with respect to a predetermined stroke amount (a predetermined stroke amount) ("corresponding to a predetermined amount") is smaller than a target servo pressure value (predetermined pressure) (corresponding to "predetermined value") to the predetermined stroke amount in the control map of the REG mode (S105). A predetermined stroke amount of the present embodiment is set to a stroke amount that is greater than a stroke amount in which the servo pressure rises with respect to an increase of the stroke amount when the master system is normal, and is smaller than a stroke amount in which the servo pressure rises with respect to an increase of the stroke amount when the master system fails, in the REG mode. That is, when seeing from a viewpoint of detection accuracy of the master system failure, a predetermined stroke amount is preferably set to a stroke amount in which the servo pressure rises greatly with respect to an increase of the stroke amount when the master system is normal. Furthermore, a predetermined pressure is set to be equal to or less than the servo pressure value to a predetermined stroke amount in the control map of the REG mode. In the present embodiment, a servo pressure value relative to a predetermined stroke amount is set to a predetermined pressure. However, the predetermined pressure is a threshold value for discriminating presence or absence of the failure, and is able to be set by the degree of the failure to be detected.

When the servo pressure detected when the stroke amount reaches a predetermined stroke amount is equal to or greater than a predetermined pressure (S105: No), the state is determined to be normal, and the REG mode is maintained as it is (S106). In this case, the REG mode is maintained (S106) until the stroke amount is 0 (S107: No). Moreover, when the stroke amount is 0 (S107: Yes), the REG mode is finished, and the mode is switched to a normal linear mode (S108). That is, if the master system is normal, the brake ECU 6 performs the brake control in an initial brake operation in the REG mode, and performs the brake control in the linear mode with respect to the second brake operation and thereafter.

Meanwhile, when the detected servo pressure is less than a predetermined pressure (S105: No), the brake ECU 6 determines that the master system fails (S109), for example, raises a failure flag, and operates a notification means (not illustrated) for notifying a driver (for example, turns a warning lamp on). Moreover, when a driver continuously steps the brake pedal 115, and the stroke is greater than a predetermined stroke amount, the brake ECU 6 switches the control mode to the linear mode (herein, a linear mode for during a failure) (S110). As illustrated in FIG. 4A, when the master system fails, the start of the servo pressure value to the stroke amount is delayed, and a proportional constant of the servo pressure value to the operation force also becomes smaller.

In the liner mode for during a failure, although there is the same control as the linear mode, a referred control map is different from the normal map. That is, the brake ECU 6 has a control map for during a failure, separately from the normal map. In the control map for during a failure, a target servo pressure value to the stroke amount is set to be greater than a target servo pressure value to the stroke amount in the control map of the normal linear mode.

In the present embodiment, a target servo pressure value in the control map for during a failure is set to be twice as large as that in the normal time, as illustrated in FIG. 4A (a linear mode for during a failure). This is because the master cylinder pressure generated with respect to the stroke amount is reduced compared to a normal case when a master piston of one side fails. The brake ECU 6 controls the respective electromagnetic valves 41 and 42 based on the control map for during a failure, whereby the servo pressure greater than in a normal case is generated with respect to the stroke amount, and thus it is possible to increase master cylinder pressure accordingly.

In this manner, when the failure is detected, the mode is switched from the REG mode to the linear mode for during a failure in the middle of the initial brake operation, and the brake is controlled by the liner mode for during a failure in the second brake operation and thereafter.

Herein, in the present embodiment, the control map is set so that characteristics (brake characteristics) of braking force (master cylinder pressure) realized by the control map of the liner mode for during a failure are different from brake characteristics realized by the control map of the liner mode at normal times. That is, during a failure, the control map during a failure is set so that not just notification by the notification means, but also a sense of discomfort with respect to the effectiveness during actual braking is provided to the driver. Specifically, the control map for during a failure is set so that the brake characteristics during a failure are between brake characteristics at normal times and brake characteristics of the REG mode. That is, when there is a failure, the braking force to the stroke amount is slightly weaker than at normal times. However, since the mode is equal to or greater than that of the REG mode, the required brake characteristics are maintained.

According to the present embodiment, it is possible to detect a failure of the master system, and generate a suitable braking force even if a failure is generated. The brake ECU 6 configured to perform operational aspects disclosed by way of example in S104, S105, and S109 as discussed above corresponds to a failure detection means for detecting the failure of the master system (MC system). Furthermore, the booster 4 and the brake ECU 6 configured to perform operational aspects disclosed by way of example in S106, S107, S108, and S110 as discussed above correspond to a driving control means for driving the master piston. Furthermore, the decompression valve 41, the pressure booster valve 42, the pressure supply portion 43 and the regulator 44 correspond to the servo pressure generation portion that generates the controlled servo pressure within the servo chamber 127.

In addition, in the present embodiment, although the brake control in the correlation value between the stroke amount to the brake pedal 115 and the servo pressure has been mainly described, as illustrated in FIGS. 4B and C, the control may be performed in consideration of a correlation between the stroke amount to the brake pedal 115 and the deceleration (braking force of a vehicle) and a correlation between operation force to the brake pedal 115 and deceleration. The failure detection may be performed as mentioned above from a relationship between the stroke amount and the deceleration, or between the operation force and the deceleration. Specifically, when the detected deceleration (the master cylinder pressure correlation value) of a vehicle to a predetermined operation force (predetermined force) is smaller than the deceleration (a predetermined value) of vehicle to a predetermined force in the control map of the REG mode, the brake ECU 6 detects the failure, and as mentioned above, the state is switched to the control map for during a failure. That is, the master cylinder pressure correlation value may be a value correlated to the master cylinder pressure, and may be a braking force generated by the master cylinder pressure, the deceleration of a vehicle, or the master cylinder pressure itself, in addition to the servo pressure.

Figure 5:
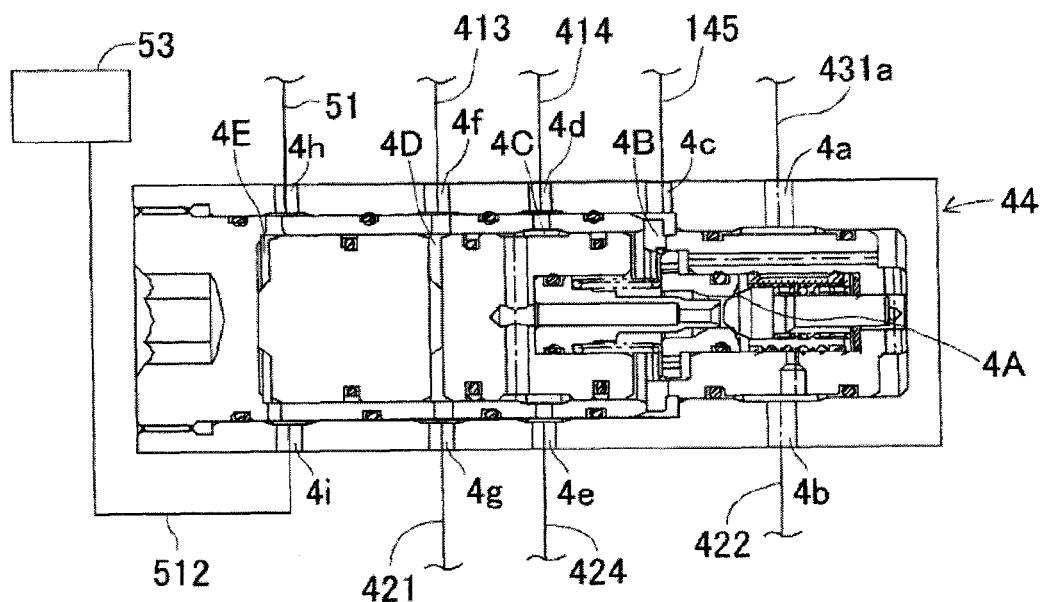
FIG. 5 is a configuration diagram that illustrates a modified form of the regulator of the present embodiment.

In addition, the structure of the present invention is not limited to the above-mentioned embodiment. For example, as illustrated in FIG. 5, the regulator 44 may have a configuration in which the port 4*i* leading to the fourth chamber 4E is formed at a position corresponding to the port 4*h*, and the port 4*i* and the ABS 53 are connected to each other by a pipe 512. The pipe 511 is removed, and the pipe 51 connects the port 134 and the ABS 53. Thereby, it is also possible to obtain the same working effect as the present embodiment.

Figure 6:
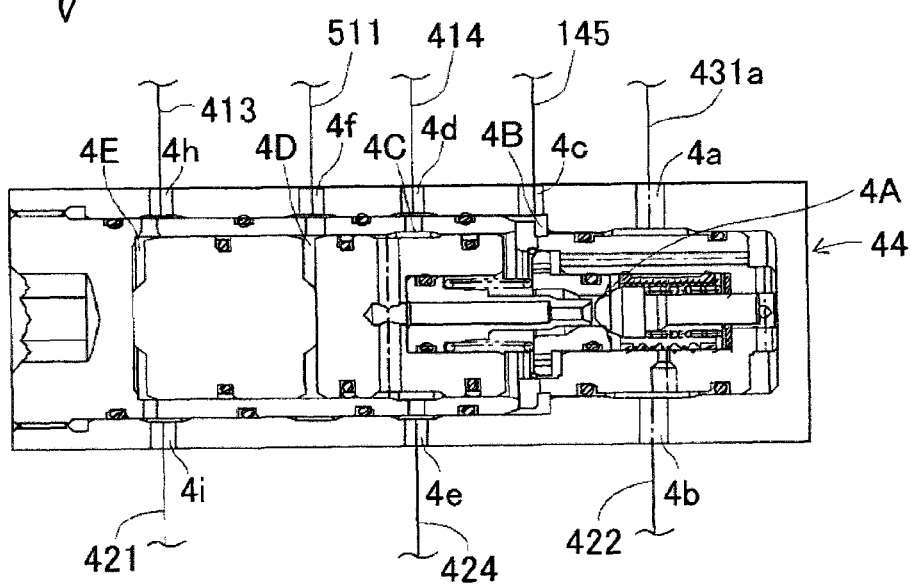
FIG. 6 is a configuration diagram that illustrates a modified form of the regulator of the present embodiment.

Furthermore, as illustrated in FIG. 6, the port 4*g* is blocked, and the pipe 511 is connected to the port 4*f*. Moreover, the port 4*h* is connected to the decompression valve 41 via the pipe 413, and the port 4*i* is connected to the pressure booster valve 42 via the pipe 421. According to this configuration, in the REG mode, the master piston pressure is added to the pressure control chamber 4D, thereby to cause the control piston 445 to slide on the cylinder bottom surface side. That is, the pressure control chamber 4D plays a role of the fourth chamber 4E of the present embodiment. Moreover, the pressure of the fourth chamber 4E in the present configuration is controlled by the respective electromagnetic valves 41 and 42 in the linear mode. When the fourth chamber 4E is pressed, the fourth chamber 4E causes the sub piston 446 and the control piston 445 to slide on the cylinder bottom surface side. That is, the role of the fourth chamber 4E is replaced with that of the pressure control chamber 4D and vice versa. By this configuration, the same working effect as the present embodiment is obtained. Furthermore, in the present embodiment, although the failure of the master system is detected along with the operation of the brake pedal 115 after the ignition is turned ON, the failure of the master system may be detected whenever a vehicle is stopped.

What is claimed is:

1. A vehicle brake device comprising:
   first and second master chambers;
   a first master piston driven by any one of an operation force applied to a brake operation member by a driver and a force corresponding to a servo pressure in a servo chamber to generate a first master cylinder pressure in a first master chamber;
   a second master piston driven by a force corresponding to the first master cylinder pressure to generate a second master cylinder pressure in a second master chamber;
   a servo pressure generation portion configured to generate a servo pressure in the servo chamber;
   a failure detection means for detecting a failure of a master system, when a master cylinder pressure correlation value correlated to the first master cylinder pressure is less than a predetermined value, in a case where the first master piston is driven only by the operation force applied to the brake operation member by the driver and either: i) an operation amount of the brake operation member is a predetermined amount; or ii) the operation force applied to the brake operation member by the driver is a predetermined force; and
   driving control means for driving the first master piston by a force corresponding to the servo pressure in the servo chamber generated by the servo pressure generation portion, when the operation amount of the brake operation member by the driver is greater than a predetermined amount or when the operation force applied to the brake operation member by the driver is greater than a predetermined force, in the operation of the brake operation member by the driver in which the failure detection means detects the failure of the master system.

2. The vehicle brake device according to claim 1, wherein the driving control means drive the first master piston by the servo pressure greater than a normal condition with respect to the operation amount of the brake operation member of the driving being performed using a force corresponding to the servo pressure generated in the servo pressure generation portion, in an operation after the operation of the brake operation member in which the failure of the master system is detected, when the failure detection means detects the failure of the master system.

3. The vehicle brake device according to claim 1, wherein the driving control means drive the first master piston by a force corresponding to the servo pressure generated in the servo pressure generation portion when the failure detection means does not detect the failure of the master system, and the driving control means drive the first master piston so as to have characteristics different from the master cylinder pressure correlation value to the operation amount of the brake operation member when driving the first master piston only using the servo pressure at normal times, the driving being performed using a force corresponding to the servo pressure generated in the servo pressure generation portion, in an operation after the operation of the brake operation member in which the failure of the master system is detected, when the failure detection means detect the failure of the master system.

4. The vehicle brake device according to claim 2, wherein the driving control means drive the first master piston by a force corresponding to the servo pressure generated in the servo pressure generation portion when the failure detection means does not detect the failure of the master system, and the driving control means drive the first master piston so as to have characteristics different from the master cylinder pressure correlation value to the operation amount of the brake operation member when driving the first master piston only using the servo pressure at normal times, the driving being performed using a force corresponding to the servo pressure generated in the servo pressure generation portion, in an operation after the operation of the brake operation member in which the failure of the master system is detected, when the failure detection means detect the failure of the master system.

* * * * *